United States Patent [19]

Eslick et al.

[11] 4,054,671

[45] Oct. 18, 1977

[54] METHOD FOR MANUFACTURING BEER

[75] Inventors: Robert F. Eslick; Kenneth J. Goering, both of Bozeman, Mont.

[73] Assignee: The Research Corporation, New York, N.Y.

[21] Appl. No.: 647,567

[22] Filed: Jan. 8, 1976

[51] Int. Cl.² .................. C12C 9/00; C12C 11/04
[52] U.S. Cl. .................. 426/16; 47/DIG. 1; 195/17; 195/18; 426/29
[58] Field of Search .................. 426/18, 28, 29, 618, 426/16; 195/70, 71, 17, 18; 47/DIG. 1, 58

[56] References Cited

U.S. PATENT DOCUMENTS 3,576,645  4/1971  Rozsa .................. 195/70 X

OTHER PUBLICATIONS

Goering, et al., Barley Starch IV, A Study of the Cooking Viscosity Curves of twelve barley genotypes, Cereal Chemistry, vol. 47, 1970 (pp. 592-596).

Goering et al., Barley Starch V, A Comparision of the Properties of Waxy Compana Barley Starch with the Starches of its Parents, Cereal Chemistry, vol. 50, 1973 (pp. 322-328).

Primary Examiner—David M. Naff
Attorney, Agent, or Firm—Oblon, Fisher, Spivak, McClelland & Maier

[57] ABSTRACT

Beer is brewed by a method in which a malted grain is combined with starch from a barley variety characterized by containing starch granules which are self-liquefying and produced by cross-breeding a first barley variety characterized by a hulless gene, $n\ n$ on chromosome 1 and a second barley variety which is characterized by a waxy endosperm gene $wx\ wx$ on chromosome 1.

5 Claims, No Drawings

METHOD FOR MANUFACTURING BEER

BACKGROUND OF THE INVENTION

1. Field of the Invention

The present invention relates to a method for manufacturing beer. More particularly, the present invention relates to a beer manufacturing process in which self-liquefying barley starch granules containing a high content of d-amylase enzyme are used alone or are mixed with a starch adjunct such as wheat, corn or rice starch in the preparation of the mixture to be fermented for the manufacture of beer.

2. Description of the Prior Art

Starch is usually obtained in the form of granules by separation from starch containing plants or plant parts. In the brewing of beer, the starch is first pasted and then liquefied by cleavage of the starch molecules to reduce the viscosity of the starch paste. The granules are initially insoluble in water, but when heated in water, they begin to swell, imbibing water rapidly until they are many times their original size. Upon continued heating, the granules begin to disintegrate and the viscosity of the water-starch mixture begins to rapidly increase until it reaches a maximum, thereby forming a paste. If the starch is a waxy starch, further heating after the maximum viscosity is reached results in an initial drop in viscosity, however, cooling of the partially solubilized paste causes the hydrated molecules and segments of granules to insolubilize forming a paste probably through H-bonding of starch chains. In the case of normal starches, this paste on cooling will form a stiff gel. Waxy starches will remain somewhat fluid. This initial cooking phase usually requires heating to temperatures in the range of 85° – 105° C, depending upon the particular variety of starch being treated. In this critical cooking phase, viscosities as low as 300–400 Brabender viscosity units are attainable, however, under miscroscopic examination, the granules will show a substantial increase in size resulting in a substantial reduction in size of the starch molecules.

In enzyme conversion, the enzymes rupture interior chains on both the amylase and amylopectin molecules resulting in a substantial reduction in size of the starch molecules. The smaller molecues are usually referred to as $\alpha$ dextrins. Liquefication is said to occur when 8% pastes show a Brabender viscosity in the range of 0–20 units. However, the exact extent of liquefication will be determined by the particular application for the starch.

In the past, where it has been desired to liquefy the paste in the brewing of beer, enzyme conversion to liquefy the paste was accomplished by addition of an enzyme into the paste followed by mild heating. Thus, in order to make a liquefied product suitable for beer brewing, a malt infusion was first prepared which contained a high percentage of $\alpha$-amylase and the infusion was added to the starch paste.

In normal brewing operations, part of the barley malt is added to an adjunct (corn starch, rice, or corn grits) and the mixture heated to boiling. During the heating process, the starch is gelatinized and partially converted; however the enzyme is destroyed before the process is completed. The cooked adjunct is then added to the main malt mash which is heated to 65°, held for a half hour and then gradually heated to 75° which it is maintained for 3-4 hours in order to convert and extract as much material as possible.

It is known that most cereal grains do not contain substantial amounts of $\alpha$-amylase. Thus, in order to obtain a starch source containing sufficient amounts of $\alpha$-amylase for the fermentation process, it has been necessary to allow a cereal grain, normally barley, to germinate. The germination process is only allowed to continue until the $\alpha$-amylase content of the barley increases by a factor of 200 to 10,000. This process is known in the brewing art as malting. That is, the $\alpha$-amylase content of the barley increases from 0.045 units before malting to 90.0 after malting.

Barley contains $\beta$amylase. However $\beta$amylase has very limited action on starch attacking only the non-reducing ends of the starch chains. It cannot attack interior chains so it has a very minimal effect on reducing viscosity of starch paste. Even when $\alpha$-amylase is produced in cereals by malting it will not be retained on the starch granule since it is quite water soluble. Furthermore it is sensitive to heat and therefore is destroyed during the cooking phase.

It was long recognized that if the enzyme could be protected during these initial processing stages, that a self-liquefying starch could be obtined which would not require the addition of further enzymes to the starch paste. However, heretofore no satisfactory technique for protecting the enzymes has been developed. For instance, consideration was given to bind the enzymes by lime water treatment so that it is not steeped from the grains too quickly, or by formaldehyde treatment or the like. None of these techniques, however, have proven to be commercially acceptable or to protect a large enough percentage of the enzymes.

If a starch granule could be developed which would be self-liquefying without the addition of further enzymes, or, even more desirably, without cooking, the demand for such a starch source in the brewing industry would be quite significant. The starch source could be used as a replacement for corn syrup, and if the source were prepared from barley grain, it would have a substantially lower cost and, hence, would be quite competitive with corn syrup. Since it would enable the elimination of at least one and possible two processing steps normally required for the utilization of starch, it would be highly advantageous in a wide variety of applications.

A need therefore, continues to exist for a self-liquefying starch material for use as a starch source in the brewing of beer.

SUMMARY OF THE INVENTION

Accordingly, one object of the present invention is to provide a starch source containing a relatively high amount of $\alpha$-amylase which is useful as a starch source in the brewing of beer.

Another object of the present invention is to simplify the brewing process of beer by employing a self-liquefying starch material in the fermentation stage.

Briefly, these objects and other objects of the present invention as hereinafter will be come more readily apparent can be attained in a method of brewing beer in which a malted grain is combined with starch from a barley variety characterized by containing starch granules which are self-liquefying and produced by cross-breeding a first barley variety characterized by a hulless gene, n n on chromosome 1 and a second barley variety which is characterized by a waxy endosperm gene wx wx on chromosome 1.

DETAILED DESCRIPTION OF THE PREFERRED EMBODIMENTS

In the conventional beer brewing process, a malt must be obtained for the fermentation process. Normally, barley grain is selected for this purpose. The barley grain is converted to barley malt by allowing barley grain to start the growing process by germination. In the germination process a variety of chemical conversions occur, but one result of the germination process is that the α-amylase content of the grain is increased. It is also believed that all of the β-amylase is naturally present and that perhaps the malting process may result in somewhat increasing the availability of the enzyme. At the appropriate time, the malt forming process is stopped by withholding water and air from the grains and then drying the grains. The barley malt can then be combined with water or brewery liquor, yeast and other additives such as hops, to start the fermentation process. Alternatively, the malt can be extracted to obtain a malt extract. The malt extract is normally obtained by steeping the malted barley in water which dissolves the water soluble material therefrom. The resulting aqueous solution containing the soluble material can be used as such or concentrated under vacuum to yield a syrup (diastatic malt syrup) before it is used. The aqueous solution cannot be concentrated by boiling at atmospheric pressure since this would destroy the enzyme.

A fermentation medium is prepared by adding appropriate amounts of brewery yeast to the malt and other beer making ingredients in water. Currently, beer manufacturing practices are requiring increasing use of corn syrup as an adjunct because it increases brewery capacity and it reduces malt requirements. The hop requirements in normal beer brewing operations is approximately 0.5 pounds per 31 gallons of beer. Normally, yeast separated during the lagering stage, which is the step in which the beer is retained in a cool area to slowly ferment and age, is added to the medium to start the fermentation process. During lagering the yeast collects either at the top or bottom of the brew depending upon whether a top or bottom yeast is used. The beer is decanted from the yeast and a certain amount (after the purity is checked) of the yeast as a slurry containing considerable amounts of beer is added to the fermentor. The amount of yeast slurry added to the fermentor is not critical and is an amount sufficient to conduct a normal brewing operation, usually about 5% by volume of the slurry.

Suitable species of yeast used in the brewing process include *Saccharomyces cerevesiae* as well as *Saccharomyces carlsbergensis* Hansen and *Saccharomyces monacensis* which are also used in Europe.

Fermentation is conducted anaerobically at a temperature of 6–12° C for about 8–10 days for a bottom yeast and at 14–23° C for about 5–7 days for a top yeast. The beer, which at this stage is referred to commonly as "green" or "young" beer, is stored in refrigerated cellars for periods of 2 weeks to several months at a temperature of about 0° C. Thereafter, the beer can be filtered to remove any yeast cells, recarbonated and bottled or canned, the alcohol content of the beer produced depends on the type of product desired and where it is sold and normally ranges from 3.5–7% by volume.

In normal brewing operations, a portion of a prepared barley malt is added to a starch adjunct such as corn starch, rice or the like. This mixture is then heated during which processing the starch forms a gel and the starch is partially liquefied by enzyme conversion. However, this heat processing destroys the enzyme. Consequently, complete conversion of the starch granules by enzyme action cannot be obtained unless more malt is added to the heated adjunct. It is the discovery of the present invention that a self-liquefying starch material derived from a special, non-naturally occuring variety of barley is a substitute for the conventional converted starch material derived from the heat processing of malt treated starch adjuncts. The self-liquefying starch of the present invention is obtained from barley grains derived by cross-breeding two cultivars of barley, one cultivar of which has a hulless gene (*n n*) on chromosome 1 and the other having a waxy endosperm gene (*wx wx*) located on chromosome 1. In a preferred embodiment of the cross-breeding, the first variety has both a short awn gene 1*k*2 1*k*2 and a hulless gene *n n* on chromosome 1. Cross-breeding can be accomplished by hand crossing the flowers of each of the two varieties so as to produce $F_1$ seed, followed by selection in the $F_2$ of the desired gene-type, *n n wx wx*, or *n n* 1*k*2 1*k*2 *wx wx*. A particular example of such a cross-bred variety is a barley grain referred to as "Washonupana" which is prepared from the following pedigree: 'Waxy Oderbrucker'/7* 'Compana'/2/'Sermo'/7* 'Compana', $F_4$. The breeding history of Compana from which the Washonupana is prepared is found in Technical Bulletin No. 1224, USDA, Classification of Barley Varieties Grown in the United States and Canada in 1958.

The self-liquefying barley starch granules derived from the cross-bred barley described above are obtained from the barley grains by the procedure described in the copending U.S. application, Ser. No. 553,680, filed Feb. 27, 1975. The prepared starch granules paste at temperatures of 65° to 75° C, and most often at a temperature of 73° C. The starch liquefies by the destruction of molecular bonds at temperatures of 66° to 92.5° C. The starch paste can be stabilized at any viscosity between 10 and 1000 Brabender units.

Although various barley variety seeds have been cross-bred in the past in essentially the same manner as carried out in the present invention, the object and result of the prior art cross-breeding has been to obtain a new variety having the characteristic of each of the varieties being cross-bred. A surprising and unexpected aspect of the present barley strain is the discovery that the present barley variety possesses a characteristic not present in any of the three varieties being crossed, nor a composite characteristic of any or all of the varieties cross-bred, namely, that it contains substantial amylase and that the amylase is bound with such high tenacity to the starch granules that only a minimal amount is extracted during normal separation of the granules from the grain, and only a minimal amount is inactivated during pasting. The result is a starch granule which is self-liquefying, i.e., does not require the addition of further enzymes to effect liquefication.

What makes this characteristic even more unexpected and surprising is that ordinarily unmalted or non-germinated cerals, such as wheat, barley, maize, sorghum, rice or the like, do not contain appreciable amounts of α-amylase. In contrast, not only does the barley variety of this invention possess high amounts of α-amylase, but its bonding onto the starch is unique.

The liquefying enzyme is presumed to be predominantly α-amylase. However, it is theorized that a substantial amount of iso-amylase may be present, and it will deliquefy the starch by debranching the amylopectin and fragmenting the amylase chain. All barley varities contain substantial amounts of β-amylase. The isoamyl se in combination with β-amylase provide suitable conversion.

When starch is separated from the grain, the β-amylase is lost because it is soluble in the processing medium leaving only α-amylase bound to the starch granules. This occurs only with the self-liquefying barley variety of the present invention. This prevents the production of large amounts of sugar. However, α-amylase if left on the starch granules long enough will reduce a high percentage of the starch chains to maltose and glucose leaving only a small fraction of what are known as α-limit dextrins. Therefore, it is possible to over convert the starch if sufficient amounts of α-amylase are used and it is left on the starch long enough.

In the beer brewing process of the present invention, the self-liquefying starch granules derived from the above described special species of barley are combined in amounts of 10 to 75% in a brewery liquor with other brewing ingredients including yeast, malt and hops. Of course, the self-liquefying starch granules liquefy not only themselves, but also added corn starch, rice or corn grits. Thus, these starch-self-liquefying starch granules can be added to the brewery liquor. In experiments leading to the present invention the present self-liquefying granules thinned five times their weight of other starch material.

Another embodiment of the present invention is the fact that the barley variety of the present invention can be malted in the same manner as conventional cereal grains to form a satisfactory malt for brewing purposes. Barley malt is conventionally formed by moistening the barley grains and allowing the moistened grains to germinate over a period of about 4–10 days. The barley is first steeped for 35–45 hours. The water content is usually 44–47% at temperature 12–15° C. The grains are allowed to germinate at a temperature of 14° to 16° C. After a suitable germination period, the barley granules are dried at initial temperatures of as low as 40–50° C. Thereafter, the temperature is gradually increased as the grains dry to a final temperature of 75° C and the enzyme system is stabilized. A gentle agitation removes the sprouts and the malted barley which appears very much like the original grain is stored and shipped in this condition. Before use it is ground which makes the enzymes more readily available for water extraction.

Malt extract is obtained from the malted grains above by steeping the ground malted grains in water at a temperture of 25° to 40° C for 2 to 5 hours to dissolve all water soluble material from the malted grains. Therefter, the aqueous solution is used as such or is concentrated under vacuum at temperatures below 60° C to a heavy syrup.

Another embodiment of the present invention is to use the whole grain as a brewing adjunct.

Having generally described this invention, a further understanding can be obtained by reference to certain specific examples which are provided herein for purposes of illustration only and are not intended to be limiting unless otherwise specified.

EXAMPLE 1

Formation of Washonupana Barley

Barley has 7 chromosomes which are identifiable morphologically and genetically. The genes, of course, are located on these chromosomes. The gene $n\ n$ is naked seed characteristic; as compared to N $n$, which is covered seed, and N N, which is also covered seed. The N $n$ plant will produce progeny that may be covered or naked, i.e., segregate. N N and $n\ n$ plants will always breed true, covered or naked, respectively. The genes of Washonupana barley are $n\ n$ (naked seed), $wx\ wx$ (waxy endosperm gene) and $1k2\ 1k2$ (short awn). $Wx$ and $Lk2$ are the normal endosperm and long awn genes, respectively.

The genetic complement of Washonupana on chromosome 1 is $$\frac{lk2\ n\ Msg10\ wx}{lk2\ n\ Msg10\ wx}$$

- - - - = chromosome segment from Sermo
. . . . = chromosome segment from Waxy Oderbrucker The remainder of the chromosome is probably from Compana.

Msg10 is the fertile gene, as compared with msg10 which is the male sterile gene.

Washonupana was developed by crossing Compana msg10 msg10 male sterile with Sermo. This cross was repeated 7 times in each instance using a short awned $1k2\ 1k2$ naked $n\ n$ F$_2$ segregate as the male. Map-wise the cross was:

$$\frac{Lk2\ N\ msg10\ Wx}{Lk2\ N\ msg10\ Wx}\ \text{(male sterile Compana)}$$
$$\times$$
$$\frac{lk2\ n\ Msg10\ Wx}{lk2\ n\ Msg10\ Wx}\ \text{(Sermo)}$$

This then gave rise to the following fertile non-segregating backcross genotypes.

$$\frac{lk2\ n\ Msg10\ Wx}{lk2\ n\ Msg10\ Wx} \qquad 1.$$

$$\frac{lk2\ N\ Msg10\ Wx}{lk2\ N\ Msg10\ Wx} \qquad 2.$$

$$\frac{Lk2\ n\ Msg10\ Wx}{Lk2\ n\ Msg10\ Wx} \qquad 3.$$

$$\frac{Lk2\ N\ Msg10\ Wx}{Lk2\ N\ Msg10\ Wx} \qquad 4.$$

Compana itself is of the genotype:

$$\frac{Lk2\ N\ Msg10\ Wx}{Lk2\ N\ Msg10\ Wx} \qquad 5.$$

Genotypes 1, 2, 3 and 4 were evaluated and there was no evidence of the amylase bonding effect characteristics of Washonupana. Note these are all normal endosperm types.

Subsequent to the completion of the above crosses a second background program was started that led to Wapana. Compana msg10 msg10 plants were crossed with Waxy Oderbrucker as the male. F$_2$ waxy endosperm segregates were crossed again to male sterile Compana. This was continued until Compana had recurred in the progeny 7 times. Map-wise the cross was:

$$\frac{Lk2\ N\ msg10\ Wx}{Lk2\ N\ msg10\ Wx}\ \text{(Male sterile Compana)}$$

-continued $\frac{Lk2\ N\ Msg10\ wx}{Lk2\ N\ Msg10\ wx}$ (Waxy Oderbrucker)

These crosses then gave rise to the following fertile non-segregating backcross genotypes.

6. $\frac{Lk2\ N\ Msg10\ wx}{Lk2\ N\ Msg10\ wx}$

7. $\frac{Lk2\ N\ Msg10\ Wx}{Lk2\ N\ Msg10\ Wx}$

Genotype 6 was evaluated and there was no evidence of the amylase bonding effect characteristics of Washonupana. Genotype 6 is Wapana.

To produce Washonupana another male sterile genotype from the first cross, i.e., from the same last cross as genotypes 1 through 4, was selected as female parent and crossed with genotype 6 as the male. This cross is represented as:

$\frac{lk2\ n\ msg10\ Wx}{lk2\ n\ msg10\ Wx}$ (Sermo/7/Compana)

×

$\frac{Lk2\ N\ Msg10\ wx}{Lk2\ N\ Msg10\ wx}$ (Wapana)

The $lk2\ n$ msg10 female was used since this particular chromosome segment had seemed to produce something slightly different from Compana in viscosity curves, seedling growth, and in nutrition studies. Also, all the homozgous (true breeding) combinations could be recovered from this cross. They are:

8. $\frac{lk2\ n\ Msg10\ wx}{lk2\ n\ Msg10\ wx}$

9. $\frac{lk2\ N\ Msg10\ wx}{lk2\ N\ Msg10\ wx}$

10. $\frac{lk2\ n\ Msg10\ Wx}{lk2\ n\ Msg10\ Wx}$

11. $\frac{lk2\ N\ Msg10\ Wx}{lk2\ N\ Msg10\ Wx}$

12. $\frac{Lk2\ n\ Msg10\ wx}{Lk2\ n\ Msg10\ wx}$

13. $\frac{Lk2\ N\ Msg10\ wx}{Lk2\ N\ Msg10\ wx}$

14. $\frac{Lk2\ n\ Msg10\ Wx}{Lk2\ n\ Msg10\ Wx}$

15. $\frac{Lk2\ N\ Msg10\ Wx}{Lk2\ N\ Msg10\ Wx}$

Genotype 8 is Washonupana.

EXAMPLE 2

The following procedure was used to prepare malted barley grains derived from SAHW Compana (Washonupna) and Compana barley.

Barley grains were steeped in a water bath at a temperature of 14° C with aeration for 42 hours. At this time the development of short sprouts on the grains was noticed. The grain was then transferred to a Buchner funnel and air, humidified by bubbling air through water maintained at 14° C by a water bath, was passed up through the grain. The top of the funnel was covered with several layers of cheese cloth and a piece of wet absorbent cotton to prevent drying out of the grain. Each morning over a period of 4 days, the grain was removed from the funnel and spread onto a pan. The grains were then lightly sprinkled with water, mixed and reintroduced into the funnel. After 4 days, the grain was removed from the funnel and dried over a week end in an air stream maintained at 45° C. The grains were ground and the resulting 4 day malt was obtained. Usually, malting is accomplished over a period of 6–10 days. However, the shorter time was selected because it was believed that if the Washonupana is a better malt source, it would be more evident from the procedure.

The data in Table I below which show the amount of alcohol produced ($CO_2$ lost) were obtained by the following procedure. A 37.1 g sample of waxy maize starch (about 99.3% starch and containing small amounts of ash, protein and fat) was mixed with 0.2 g of a malt, 400 ml of tap water and heated gradually to 85° C. The mixture was allowed to cool gradually to 70° C in order to paste any resistant granules and then quickly cooled in a water bath to 60° C. An additional 1.3 g of malt was then added for final conversion by holding the mixture at 60° C for 5 minutes and cooling to 30° C. A 1 g amount of dried baker's yeast was then added to the mixture. Flasks containing the mixture were weighed and placed in a water bath held at 30° C for fermentation. The flasks were weighed every 24 hours to determine the amount of $CO_2$ lost. A control flask containing malt and yeast but no starch was treated in the same manner. Corrections in the weight loss of the starch containing mixtures were made by adjusting the loss data by the weight loss in the control sample. A check was run using a Gibberellin distillers malt as a control.

Table 1

| Example | Malt source | 72 hour weight loss($CO_2$)(g) | % Yield* |
|---|---|---|---|
| 1-1 | SAHW Compana(Washonupana) | 13.9 | 97 |
| 1-2 | Compana | 12.3 | 87 |
| 1-3 | Gibberellin distillers malt | 14.3 | 100 |

*Yield based on high quality Gibberellin distillers malt as theory or 100%.

It is evident from the data above that the yield is significantly greater for the Washonupana variety of barley than the Compana variety of barley.

The yield of alcohol can be calculated from the $CO_2$ weight loss data in the Table above by use of the following equation.

$$C_6H_{10}O_5 + H_2O \rightarrow 2C_2H_5OH + 2CO_2$$

EXAMPLE 3

The procedure described in Example 2 for the conversion and fermentation of waxy maize starch was employed in a series of experiments in which the saccharifying agent or malt source was varied. The amount of alcohol produced is indicated by the weight loss of carbon dioxide. The extract of Washonupana was obtained by steeping Washonupana grain in water at 20° C for 1 hour in the presence of 0.05% sodium bisulfite to assist in the release of the bound α-amylase and 0.10% of calcium acetate to stabilize the enzyme.

Table 2

| Example | Starch Source | Wt. of Sample(g) | Saccharifying agent (g) | $CO_2$loss(g) |
|---|---|---|---|---|
| 3-1 | Waxy maize | 37.1 | 5.5-g distillers malt | 18.2 |
| 3-2 | " | " | 3.5-g distillers malt | 18.1 |
| 3-3 | " | " | 2.4-g distillers malt | 14.3 |
| 3-4 | " | " | 2.4-g distillers malt + extract from 10 g Washonupana grain | 17.4 |
| 3-5 | " | " | 1.9-g distillers malt | 14.5 |
| 3-6 | " | " | 1.9-g distillers malt + extract from 4 g Washonupana grain | 15.9 |

EXAMPLE 4

The procedure described in Example 2 for the conversion and fermentation of waxy maize starch was employed in the following series of experiments in which three different starch sources were used and in which the saccharifying agent was varied as indicated.

Table 3

| Example | Starch Source | Wt. of sample (g) | Saccharifying agent(g) | $CO_2$loss(g) |
|---|---|---|---|---|
| 4-1 | Washonupana* | 57 | 5.7g. dist. malt | 20.0 |
| 4-2 | Waxy Compana* | 58.6 | 5.7g. dist.malt | 19.7 |
| 4-3 | Washonupana | 57 | Extract from Washonupana used | 11.1 |
| 4-4 | Waxy Compana | 58.6 | Extract from waxy Compana | 8.5 |
| 4-5 | Waxy maize | 37.1 | Extract from 22 g Washonupana | 15.4 |

*These barley samples were calculated to be equal in starch content and were intended to be about the same as the waxy maize. Apparently they were a little higher i.e. 20 g to 18.2

The extract in Table 3 for 4-3 and 4-4 was obtained by stirring the ground grain in water containing 0.1 g $NaHSO_4$, 0.4 g $Ca(OAc)_2$ and then withdrwing one-half of the liquid extract which was added back to the extracted residue at 60° C. The rest of the procedure was the same as previously described. The extract for 4-5 was extracted in manner described above but total extract from 22 g Washonupana was used.

The data of Examples 4-3 and 4-4 show that Washonupana has almost 30% more saccharifying enzyme than the parent waxy Compana.

Example 4-3 is an example where the α-amylase is extracted by the use of sodium bisulfite from ground untreated grain to demonstrate that an enzyme system is present which will saccharify the starch, that is, convert it to fermertable sugar.

Having now fully described the invention, it will be apparent to one of ordinary skill in the art that many changes and modifications can be made thereto without departing from the spirit or scope of the invention as set forth herein.

What is claimed as new and intended to be covered by letters patent is:

1. In a method for brewing beer by forming a malted barley grain, mixing said malted grain with a starch source, yeast and other beer brewing ingredients to form a brewery liquor and allowing said mixture to ferment until a wort is obtained having an ethyl alcohol content characteristic of beer, the improvement which comprises:

mixing said malted grain with a cross-bred barley variety having a pedigree of 'Waxy Oderbrucker'/7* 'Compana'/2/'Sermo'/7*"Compana', $F_4$ and designated as Washonupana and containing strch granules which are self-liquefying in that the starch granules contain a high amount of α-amylase which is tenaciously bound to the starch granules such that said α-amylase degrades the starch in said granules to maltose, glucose and small fractions of α-limit dextrins wherein said self-liquifying starch granules are present in amounts ranging from 10 to 75% in said brewing liquor.

2. The method of claim 1, wherein said malted grain is the malt derived from the malting of said cross-bred barley variety.

3. The method of claim 2, wherein said starch source is Washonupana barley grain.

4. The method of claim 2, wherein said starch source is Waxy Compana barley grain.

5. The method of claim 1, wherein said malted grain is Gibberellin distillers malt.

* * * * *